UNITED STATES PATENT OFFICE.

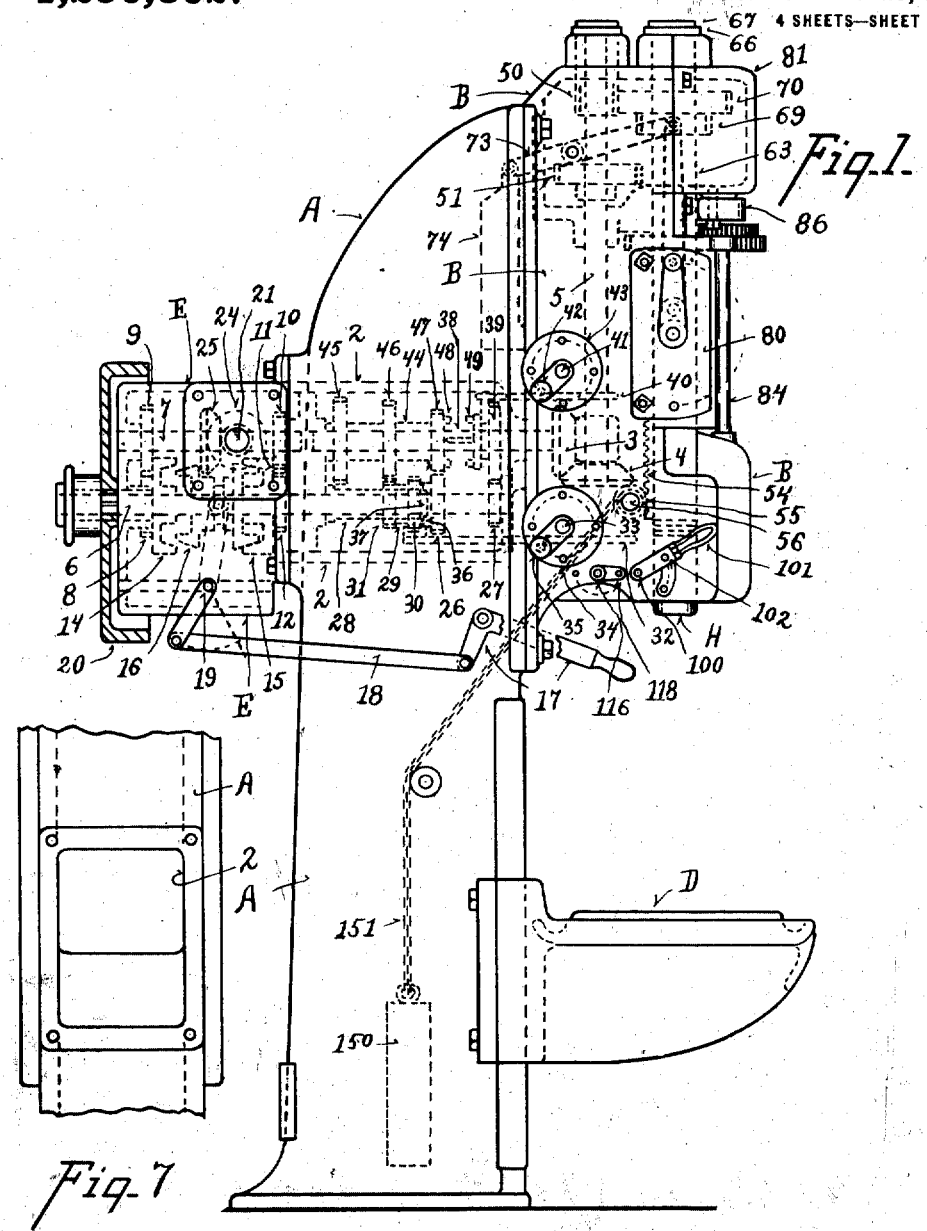

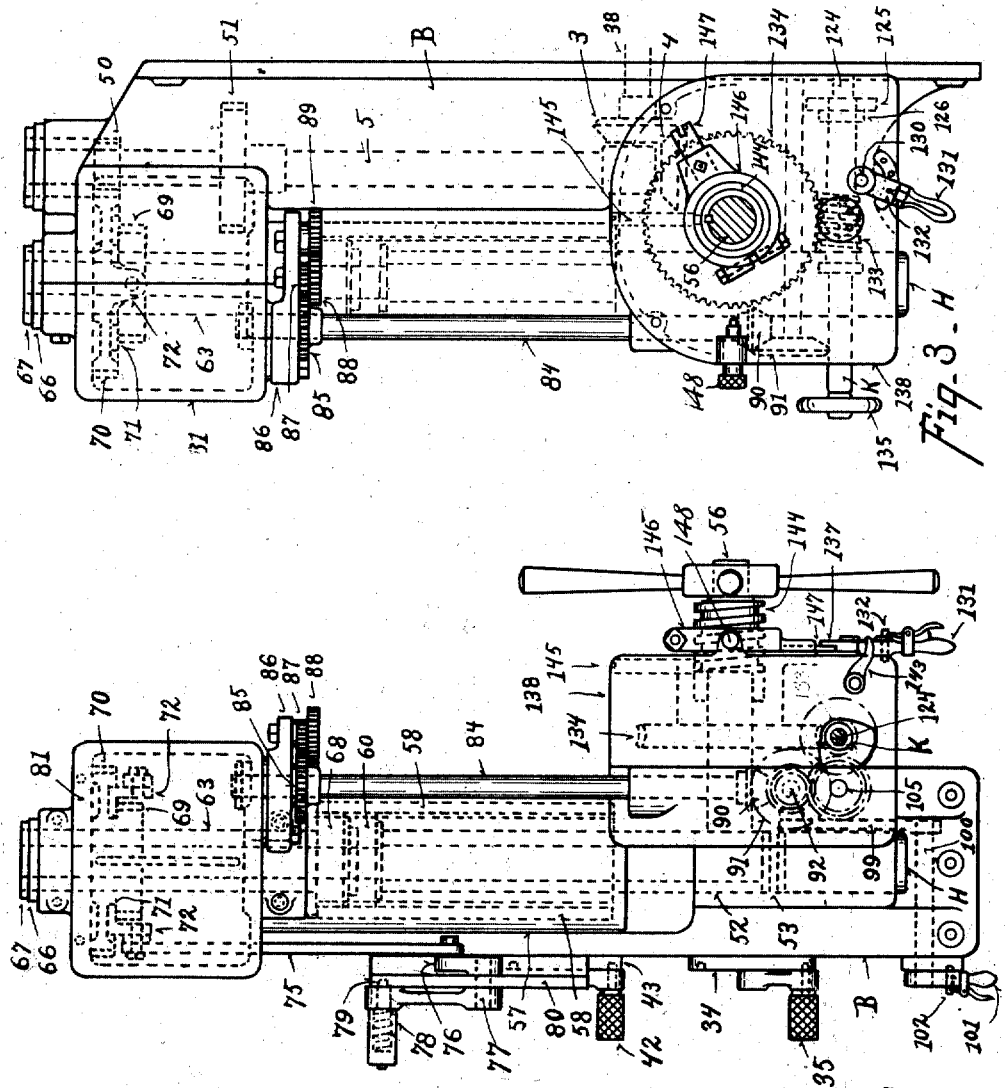

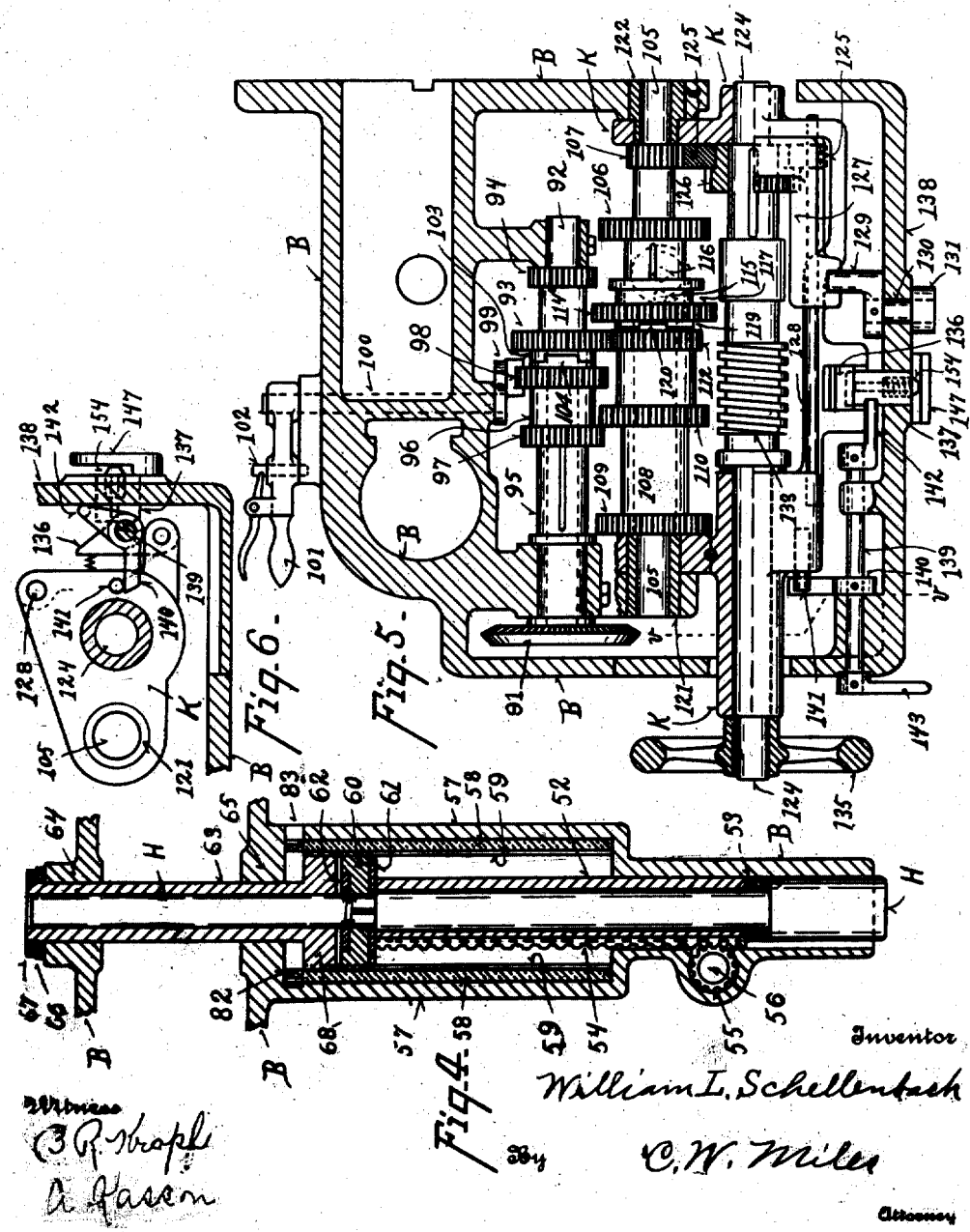

WILLIAM L. SCHELLENBACH, OF WYOMING, OHIO.

METAL-BORING MACHINE.

1,250,362.      Specification of Letters Patent.      Patented Dec. 18, 1917.

Application filed August 16, 1916. Serial No. 115,272.

*To all whom it may concern:*

Be it known that I, WILLIAM L. SCHELLENBACH, a citizen of the United States, residing at Wyoming, in the county of Hamilton and State of Ohio, have invented certain new and useful Improvements in Metal-Boring Machines, of which the following is a specification.

My invention relates to improvements in metal boring machines. One of its objects is to provide an improved supporting frame and arrangement of the operative parts relative thereto. Another object is to provide an improved and simple arrangement of the spindle driving mechanism with a wide range of speed changes. Another object is to provide improved spindle supporting and feeding mechanism. Another object is to provide improved change gear spindle feeding and controlling mechanism. Another object is to provide improved automatic feed stop mechanism. My invention also comprises certain details of form, combination and arrangement all of which will be fully set forth in the description of the accompanying drawings in which:

Figure 1 is a side elevation of a boring machine embodying my invention.

Fig. 2 is a front elevation of the drill spindle head and feed gear box detached.

Fig. 3 is a side elevation of the same.

Fig. 4 is a sectional detail of the drill spindle and its driving mechanism.

Fig. 5 is a sectional diagram illustrating the drill feeding mechanism arranged in one plane.

Fig. 6 is a sectional detail of the hand and automatic feed stop, on line *v v* of Fig. 5.

Fig. 7 is a detail of the main frame.

Figure 8:
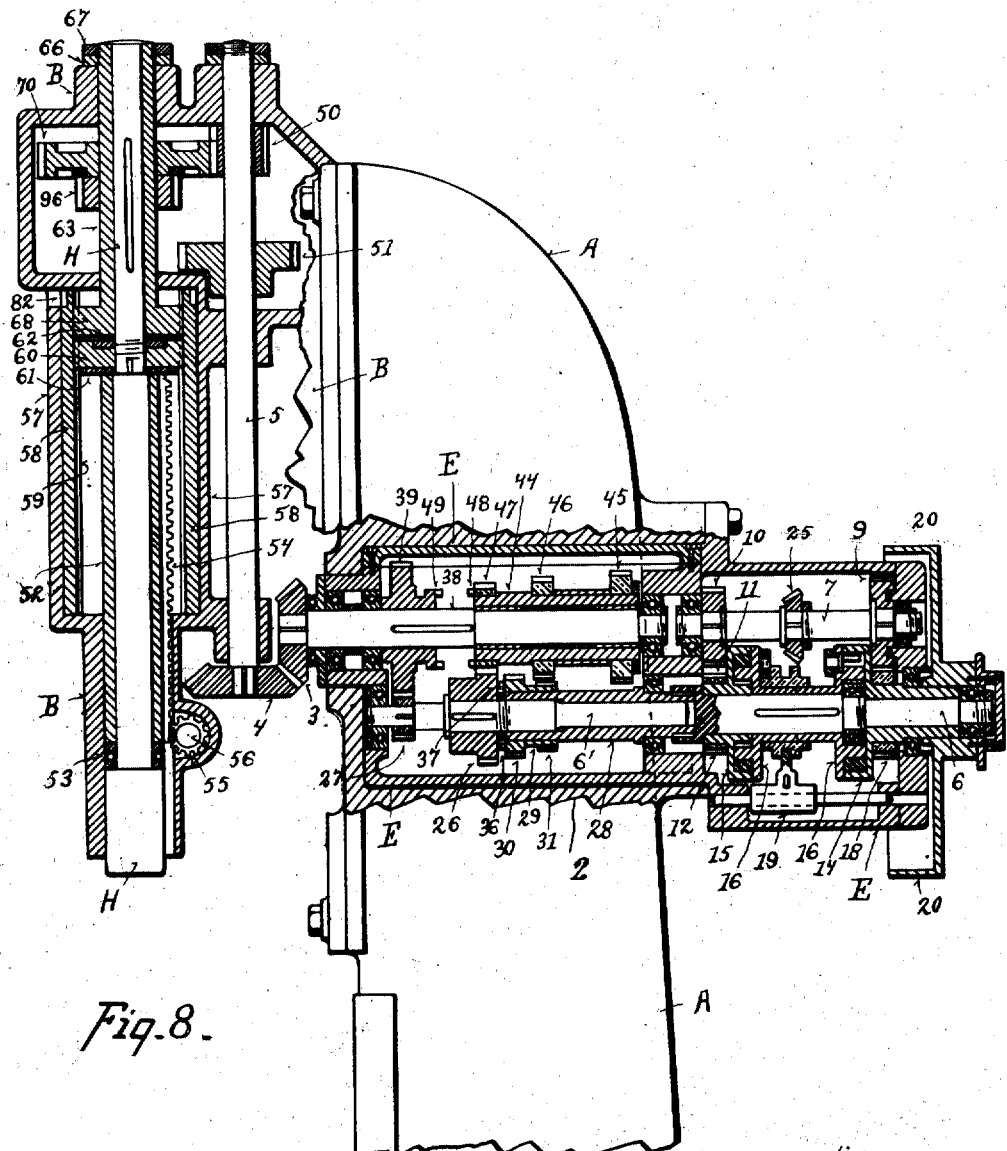
Fig. 8 is a sectional detail of the spindle driving mechanism.

The accompanying drawings represent the preferred embodiment of my invention, in which A represents the column or main frame, B represents the spindle housing detachably connected to the column A, and D a work table which may be vertically and otherwise adjustable as may be desired relative to the column A.

E represents a frame or housing in which is mounted the initial spindle driving mechanism, this housing E is detachably mounted in an eye or recess 2 in the column A so as to be readily inserted or removed as desired, and when inserted occupies a position with its terminal gear 3 in mesh with a gear 4 on the back-gear shaft 5 mounted vertically in the spindle housing, and through which power is transmitted to the drill spindle H and to the drill spindle feeding mechanism.

The mechanism contained in the housing E except wherein it relates particularly to and constitutes a part of a metal boring machine, will be embodied in a separate application. As a part of a boring machine it comprises shafts 6 and 7 journaled parallel to each other. A pair of gears 8 and 9 serve to connect the shafts 6 and 7 to rotate in opposite directions, while a group of three gears 10, 11 and 12 serve to drive shafts 6 and 7 in the same direction. The gears 8 and 12 are carried by clutch members 14 and 15 facing each other and loosely mounted on shaft 6. A double faced clutch member 16 splined to shaft 6 and shifted by hand lever 17, link 18 and shifting member 19 enable shafts 6 and 7 to be connected up to run relatively in the same or reverse direction. This enables power to be applied by belt to a pulley 20 on the hub of clutch member 14, or where more convenient at right angles to the plane of pulley 20, by means of a belt pulley, not shown, mounted on a shaft 21, and serving by means of miter gears 24 and 25 to drive the shaft 7 and shaft 6 in either the same or reverse direction.

A shaft 6' is journaled in axial alinement with shaft 6, one end being journaled to casing E and the other end journaled in a sleeve 28 which is keyed or otherwise rigidly attached to the end of shaft 6. Rigidly mounted on shaft 6' are two gears 26 and 27 of different diameters. A sleeve 29 is splined to the sleeve 28 to move endwise thereon, and is provided with two gears 30 and 31 of different diameter. A rack bar 32 is actuated by a pinion at the inner end of the controller shaft 33 to position the gears 30 and 31 along the sleeve 28, being actuated over a dial plate 34 by means of a hand lever 35 provided with a spring latch pin. The gear 26 is provided with a clutch member 36 and the sleeve 29 with a clutch member 37 to clutch the shaft 6' to the shaft 6.

A shaft 38 is in axial alinement with shaft 7 but independently rotatable. A gear 39 is splined to shaft 38 and can be shifted into and out of engagement with gear 27, by means of a rack bar 40 actuated by a pinion on the controller shaft 41 which shaft is provided with a hand lever 42 to move over a dial plate 43 and to be locked thereto by a spring latch pin. A sleeve 44 is loosely mounted on the shaft 38 and carries three gears 45, 46 and 47. The gear 47 is in mesh continuously with gear 26 on shaft 6', and gears 45 and 46 are adapted to be selectively meshed with gears 30 and 31 respectively by adjustment of sleeve 29 endwise. The sleeve 44 has a clutch member 48 and the gear 39 a clutch member 49 to engage clutch member 48 to clutch sleeve 44 to shaft 38. At the extreme inner end of shaft 38, outside of the housing E is beveled gear 3, which meshes with a beveled gear 4 on the vertical shaft 5 journaled and supported in the spindle housing B. The movement of the controller levers 33 and 41 enables the gears and clutch members to be shifted into different combinations to provide a considerable range of different speeds for the gears 3 and 4.

The shaft 5 is provided with a pinion 50 and a gear 51, rigid on shaft 5. The drill spindle H is journaled at its lower end in a sleeve 52 see Fig. 4 which sleeve is provided with a thrust collar 53 at its lower end to take the end thrust of the spindle H. A rack 54 is attached to one side of the sleeve 52 and said rack is engaged by a pinion 55 on the drill feed shaft 56, to feed the drill spindle endwise relative to the housing B.

Surrounding the middle section of the drill spindle H is a chamber 57 in which is loosely mounted a tubular driving sleeve 58 the bore of which is considerably greater than the diameter of the sleeve 52, and into which the sleeve 52 and rack 54 telescope. The inner face of the sleeve 58 has two or more keyways 59 cut therein. At the upper end of the sleeve 52 and guided endwise in the sleeve 58 by means of keys engaging the keyways 59 is a cylindrical head 60 which is keyed to the spindle H and held in place between a collar 61 seated on a shoulder of the spindle and a nut 62 threaded to the spindle. The head 60 rotates with the sleeve 58 and is free to travel longitudinally therein and serves to drive the spindle H from sleeve 58, and retains the sleeve 58 concentric with spindle H.

The upper portion of the spindle H slides endwise in a sleeve 63 which is supported in bearings 64 and 65 forming part of the housing B. The sleeve 63 is supported from its upper bearing by means of a collar 66 and nut 67, and at its lower end is provided with a head 68 to fit the upper end of the bore of sleeve 58 and provided with keys to engage the keyways 59 of sleeve 58 to drive said sleeve 58. Between the bearings 64 and 65 on the sleeve 63 are mounted a pinion 69 to mesh with gear 51 and a gear 70 to mesh with the pinion 50. (See Figs. 1 and 2).

The gears 69 and 70 are connected together and are splined to sleeve 63 to drive said sleeve at two different relative speeds from shaft 5 by shifting the gears 69 and 70 endwise on sleeve 63. A slotted collar 71 is fitted between the face of pinion 69 and the web of gear 70, and has downwardly projecting ears 72 to which the forked ends of a lever 73 are attached, and a weight 74 at the opposite end of lever 73 counterbalances the weight of gears 69 and 70. A link 75 is connected at one end to one of the ears 72 and at its opposite end to a crank arm 76 on a crank shaft 77 which has an operating hand lever 78 and a locking pin 79 to engage a bracket 80 on housing B to lock the crank arm 76 at opposite extremities of its throw, and thereby shift gears 69 and 70 endwise on sleeve 63. The cap 81 forming part of the housing B is detachable to permit assembly of the operative parts and to give access thereto. The weight of the spindle H is preferably counterbalanced by means of a weight 150 and a chain 151 drawn over a pulley on the shaft 56, see Fig. 1, thereby counterbalancing the spindle H at a point below the sleeve 59.

A gear 82 is preferably cut on the upper end of sleeve 58, and a recess 83 in the housing B enables change gears from the exterior of housing B to be meshed with gear 82. A vertical shaft 84 is journaled at opposite ends in the housing B, and at its upper end is provided with a gear 85 rigid thereon and an adjustable quadrant 86 which carries a train of detachably mounted gears 87, 88, and 89 to transmit motion from the gear 82 to the shaft 84, and by changing the gears 87, 88 and 89 at any desired relative rate of speed.

At the lower end of shaft 84 is a beveled gear 90 which meshes with and drives a beveled gear 91 keyed to a sleeve 95. A shaft 92 is journaled at one end in the sleeve 95 and at its opposite end in the casing B. Rigidly mounted on the shaft 92, see Fig. 5, are two gears 93 and 94. The sleeve 95 is held against movement endwise. A sleeve 96 is splined to sleeve 95 and provided with two gears 97 and 98. A crank arm 99 on the shaft 100 serves to shift the sleeve 96 to several different positions along the sleeve 95, and a controller lever 101 having a latch pin 102 serves to lock the sleeve 96 to any adjusted position. Clutch member 103 carried by gear 93 and a clutch member 104 carried by the sleeve 96 enable all the members on shaft 92 to be locked rigidly thereto.

A shaft 105 is journaled close to and parallel with shaft 92 and is provided with two gears 106 and 107 mounted rigid thereon, a sleeve 108 is loosely journaled thereon and confined against movement endwise, and provided with three gears 109, 110, and 112.

A gear 114 is splined to the shaft 105 and movable endwise thereon by means of a crank pin 115 on an operating shaft 116 engaging an annular recess 117 in the hub of gear to shift said gear to two different positions at the extremities of the throw of the pin 115. An operative lever 118 and latch pin on the exterior of the housing B serve to shift and lock gear 114 to position. The gear 114 has a clutch member 119 and sleeve 108 has a clutch member 120 which when in engagement serve to lock the sleeve 108 to shaft 105.

The ends of shaft 105 are journaled in sleeves 121 and 122 which are carried by the housing B and which sleeves also serve exteriorly as a hinge bearing for a yoke-shaped frame K in which is journaled a worm shaft 124. The shaft 124 is provided with two gears 125 and 126 which are attached together and splined to shaft 124 and adjustable endwise thereon by means of a keeper 127 which slides on a guide rod 128 carried by the frame K and actuated by a crank pin 129 on the crank shaft 130, which shaft is actuated by a hand lever 131 and locked by a pin 132, to enable gear 125 to be shifted into mesh with gear 107 or gear 126 into mesh with gear 106 as desired. A worm 133 meshes with and drives a worm wheel 134 on the shaft 56 which carries the pinion 55 and serves to feed the spindle H endwise. A hand wheel 135 enables the worm to be turned by hand.

The frame K being hinged upon the sleeve bearings of shaft 105 has a limited movement about the axis of shaft 105, sufficient to engage and disengage the worm with the worm wheel. To hold the worm in engagement a spring latch member 136 is carried by the frame K and a latch member 137 to engage therewith is carried by the cap 138 forming part of the spindle housing B. A shaft 139 carries a crank arm 140 to engage a pin 141 on frame K to lift the worm into engagement with the worm wheel and to cause the two latch members 136 and 137 to engage and hold the worm in mesh. A crank arm 142 on shaft 139 is in position to strike the latch member 136 and release it from latch member 137. This may be done by hand through the hand lever 143, which also serves to reset the latch member 136 in engagement with latch member 137. The latch member 137 carries a spring retracted push pin 154 which can be tripped by automatic means to push the latch member 36 out of engagement with latch member 137 thus enabling the worm to be automatically released from the wormwheel. To automatically trip the latch 136 I provide a worm 144 splined to the shaft 56. A spring pin or tooth 145 is seated in a recess in the cap member 138 and engages the spiral groove of worm 144 causing said worm to move endwise on shaft 56 as shaft 56 rotates. A split ring 146 can be clamped to any position on the worm 144 and carries a beveled tongue which may make several revolutions about shaft 56, outside of the cap 138, but will finally sweep into the same plane with and engage the head of the push pin 154 which normally projects into the recess inside of tongue 147 of the latch 137 and thereby pushes the pin 154 inwardly and forces the latch member 136 out of engagement with latch member 137 to automatically release the worm from the worm wheel and stop the spindle feed. When the split ring 146 is unclamped from the worm 144 a spring pin 148 engages a notch in the tongue 147 to hold said tongue in idle position.

As illustrated in Fig. 5 the drive would be from beveled gear 91 to sleeve 95 and through the clutch direct to gear 93 and shaft 92, thence to gear 112 and clutch to gear 114 and shaft 105, and thence by gears 107 and 125 to shaft 124. With the clutch on shaft 92 disengaged the drive would be by either of two pairs of gears from sleeve 96 to sleeve 108 and thence direct by clutch from sleeve 108 to shaft 105 or indirectly through shaft 92 by gears 112, 93, 94 and 114 to shaft 105 and thence as illustrated to shaft 124, or by way of gears 106 and 126 from shaft 105 to shaft 124, thereby providing a wide range of speeds for the drill spindle feeding shaft 56, to provide for tapping and other operations requiring speed changes between the drill driving and feeding mechanisms.

The spindle driving sleeve, of larger diameter than the spindle, with heads splined thereto, provides space in which the spindle feeding sleeve and its rack may telescope and also provides for such an arrangement of sliding key faces between the sleeve and spindle as to prevent excessive strain or cramping in use. This arrangement of the spindle drive also has several advantages in cost of production, assembly, and renewal of parts.

The mechanism herein illustrated and described is capable of considerable modification without departing from the scope of the appended claims.

Having described my invention, what I claim is:

1. A metal boring machine comprising a substantially vertical column having a drill spindle, and drill spindle driving and feeding mechanism, an eye in said column, and an initial driving mechanism detachably housed in the eye of said column to drive and feed said drill spindle.

2. A metal boring machine comprising a main frame, a drill spindle mounted upon said frame, secondary mechanism to drive and feed said drill spindle mounted upon said frame, an eye in said frame, and initial driving mechanism detachably mounted in said eye and operatively connected to said secondary driving mechanism to drive said spindle.

3. A metal boring machine comprising a main frame, a drill-spindle mounted upon said frame, secondary mechanism to drive said drill spindle mounted upon said frame, an eye in said frame, an independent housing detachably mounted in said eye and an initial driving mechanism mounted in said independent housing and operatively connected to said secondary driving mechanism to drive said spindle.

4. A metal boring machine comprising a main frame having an eye therein, a drill spindle mounted upon said frame, secondary mechanism to drive said drill spindle mounted upon said frame, an independent housing detachably mounted in said eye, an initial driving mechanism mounted in said independent housing and operatively connected to said secondary driving mechanism to drive said spindle and means to apply belt power to said initial driving mechanism in either of two planes at substantially right angles to each other.

5. A metal boring machine comprising a main frame, a drill spindle mounted thereon, secondary driving mechanism mounted on said frame to drive said spindle, an eye in said frame, a housing detachably mounted in said eye, and an initial driving and speed changing mechanism mounted in said housing and operatively connected to said secondary driving mechanism.

6. A metal boring machine comprising a main frame, a drill spindle housing, a drill spindle journaled and adjustable endwise in said housing, a rotatable primary driving sleeve concentric with and supporting one end of said spindle, a non-rotary feeding sleeve carried by said spindle near its opposite end, a secondary splined driving sleeve concentric with the intermediate portion of said drill spindle, and a head rigidly mounted on the drill spindle and splined to said secondary driving sleeve to drive the spindle therefrom.

7. A metal boring machine comprising a main frame a drill spindle housing, a drill spindle journaled and adjustable endwise in said housing, a head rigidly mounted on the spindle, a driving sleeve of greater internal diameter than the spindle journaled in the spindle housing encircling the spindle and to which said head on the spindle is splined to drive the spindle, and a non-rotary spindle feeding sleeve having telescopic relation to said driving sleeve.

8. A metal boring machine comprising, a main frame, a spindle housing, a drill spindle journaled and adjustable endwise therein, a spindle back gear shaft having gears of different diameter journaled in the spindle housing, a primary driving sleeve concentric with and supporting the outer end of the spindle, gears of different diameter splined to said primary driving sleeve and adjustable to selectively mesh with the gears on the back gear shaft to drive the primary sleeve at relatively different speeds from said back gear shaft, spindle feeding mechanism carried by said spindle housing, a gear on said primary sleeve to drive said feeding mechanism, a secondary spindle driving sleeve journaled in said housing concentric with but out of contact with the drill spindle, means to drive said secondary driving sleeve from said primary driving sleeve, a head carried rigidly by the spindle and splined to said secondary sleeve to drive the spindle, and a non-rotary sleeve on said spindle to feed the spindle endwise.

9. A metal boring machine comprising a main frame, a spindle housing, a drill spindle journaled and adjustable endwise in said housing means to drive said spindle, a non-rotary sleeve provided with a rack to feed the spindle endwise, a main feed shaft having a pinion to engage said rack and a worm wheel, means carried by said housing to drive said worm wheel comprising a primary shaft, a secondary shaft and a worm shaft, speed changing gears carried by said primary, secondary, and worm shaft respectively adjustable to change the relative speed of said shafts, and means to engage and disengage the worm on said worm shaft with said worm wheel.

10. A metal boring machine comprising a spindle housing, a drill spindle journaled and adjustable endwise in said housing, a non-rotary sleeve provided with a rack to feed said spindle endwise, a main spindle feeding shaft provided with a pinion to mesh with said rack and a worm wheel, a primary shaft having gears of different diameter rigid thereon, gears of different diameter loosely journaled and adjustable endwise thereon, and a clutch to clutch said loosely journaled gears to the shaft, a secondary shaft having gears rigid thereon, a gear splined thereto, gears carried by a sleeve loosely journaled thereon and a clutch to clutch said sleeve to said splined gear, and a worm shaft provided with a worm to mesh with and drive said worm wheel and with gears of different diameter splined thereto to selectively mesh with the gears rigid on said secondary shaft.

11. In a metal boring machine a main drill spindle feeding shaft provided with a pinion to feed the drill spindle endwise and a worm wheel, a worm shaft mounted in bearings adjustable to and from said main spindle feed shaft and provided with a worm to engage and drive said worm wheel, means to drive said worm shaft at different rates of speed, and latch mechanism to be engaged and released to engage and separate said worm and worm wheel.

12. In a metal boring machine a main drill spindle feeding shaft provided with a member to feed the drill spindle endwise, a member to drive said shaft and a worm splined thereto, a stationarily mounted tooth to engage and feed said worm endwise on said main spindle feeding shaft, a releasing dog to be clamped at a predetermined position upon said worm driving mechanism adjustable into and out of engagement with said driving member, mechanism to hold said driving mechanism in engagement with said driving member, and a latch in the path of travel of said dog to automatically release said driving mechanism from said driving member.

13. A metal boring machine comprising a main frame, a drill spindle housing, a drill spindle journaled and adjustable endwise in said housing, a head rigidly mounted on said spindle, a driving sleeve of greater internal diameter than the spindle splined to the head on the spindle, a non-rotary spindle feeding sleeve having telescopic relation to said driving sleeve, and a counterbalance for the drill spindle attached to said spindle below said driving sleeve.

14. A metal boring machine comprising a main frame, a drill spindle housing, a sleeve to rotatably drive the drill spindle rotatably suspended within the housing, a drill spindle splined to and adjustable endwise relative to said driving sleeve, a non-rotary sleeve provided with a rack and pinion drive to feed said drill spindle endwise, said non-rotary sleeve telescoping within said driving sleeve.

In testimony whereof I have affixed my signature in the presence of two witnesses.

WILLIAM L. SCHELLENBACH.

Witnesses:
C. W. MILES,
W. THORNTON BOGERT.